United States Patent [19]
Mac Conochie

[11] Patent Number: 5,190,246
[45] Date of Patent: Mar. 2, 1993

[54] SHUTTLE ORBITER WITH TELESCOPING MAIN PROPULSION UNIT AND PAYLOAD

[75] Inventor: Ian O. Mac Conochie, Yorktown, Va.

[73] Assignee: The United States of America as represented by the Administrator of the National Aeronautics and Space Administration, Washington, D.C.

[21] Appl. No.: 743,469

[22] Filed: Aug. 7, 1991

[51] Int. Cl.⁵ .............................................. B64D 27/02
[52] U.S. Cl. .................................. 244/54; 244/118.1; 244/118.2; 244/172
[58] Field of Search .................... 248/158, 172, 118.1, 248/119, 118.2, 54, 55, 137 R

[56] References Cited

U.S. PATENT DOCUMENTS

| | | |
|---|---|---|
| 3,295,791 | 1/1967 | Black . |
| 3,486,716 | 12/1969 | Haberkorn et al. ................... 244/54 |
| 3,952,973 | 4/1976 | James ..................................... 244/54 |
| 4,216,927 | 8/1980 | Byrd .................................. 244/118.1 |
| 4,273,305 | 6/1981 | Hinds . |
| 4,557,444 | 12/1985 | Jackson et al. . |
| 4,562,979 | 1/1986 | Taylor . |
| 4,667,908 | 5/1987 | Hayden et al. . |
| 4,802,639 | 2/1989 | Hard et al. ........................... 244/172 |
| 4,805,852 | 2/1989 | Nordstrom ........................ 244/137.1 |
| 4,834,324 | 5/1989 | Criswell . |
| 4,984,756 | 1/1991 | Andus ............................... 244/137.1 |
| 5,046,690 | 9/1991 | Nordstrom ........................ 244/137.1 |

FOREIGN PATENT DOCUMENTS 270372 7/1914 Fed. Rep. of Germany ...... 244/119
2069427 2/1981 United Kingdom .................. 244/54

OTHER PUBLICATIONS

A. W. Wilhite et al., "Booster and orbiter configurations", Second-Generation Shuttle—$150/lb to Low Earth Orbit, Astronautics & Aeronautics, Jun. 1983, pp. 38-42.

Primary Examiner—Joseph F. Peters, Jr.
Assistant Examiner—Virna Lissi Ansley
Attorney, Agent, or Firm—Kevin B. Osborne

[57] ABSTRACT

An improved shuttle with variable internal volume is provided by the present invention. Space shuttle orbiter 10 includes a telescoping main propulsion unit 20. This main propulsion unit 20 contains the main rocket engines 22 and fuel tanks 21 and telescopes into the shuttle. A variable cavity 30 is located between this unit 20 and the crew compartment 25. Accordingly, the positioning of the telescoping main propulsion unit 20 determines the volume of the variable cavity 30. Thus, the volume of the variable length of the entire shuttle 10 may be increased or decreased to achieve desired configurations for optimal storage. In one embodiment of the present invention, paylod 35 also telescopes within variable cavity 30.

11 Claims, 3 Drawing Sheets

SHUTTLE ORBITER WITH TELESCOPING MAIN PROPULSION UNIT AND PAYLOAD

ORIGIN OF THE INVENTION

The invention described herein was made by an employee of the U.S. Government and may be manufactured and used by or for the Government for governmental purposes without the payment of any royalties thereon or therefor.

BACKGROUND OF THE INVENTION

1. Field of the Invention

This invention relates generally to earth to orbit transportation and more specifically to a telescoping shuttle orbiter.

2. Description of the Prior Art

The space shuttle is currently the primary mode of reusable earth to orbit transportation. The current embodiment consists of an internal cargo bay of fixed volume and an external fuel tank. It is unlikely that payload for a particular mission will correspond to the available fixed volume or to the available lift capability for the selected destination. Thus, the shuttle has either unused volume or does not use its full lift capability. Further, undesirable misalignment of engine thrust and propellant mass exists.

Still another disadvantage of the current art is the inherent lack of system flexibility for developing alternate launch vehicle configurations such as expendable heavy lift versions. In these versions the payload must be moved from side mounted to in-line necessitating alteration of all the basic load paths and therefore alteration of the structure.

A proposed embodiment consists of an internal cargo bay and internal propellant tanks. This embodiment also has the disadvantage of a fixed amount of cargo space. Also, the load paths from the engine through the propellant tanks is complicated, leading to increased structural weights.

A third embodiment is a proposal for an externally mounted cargo bay which appeared in the January 1984 issue of *Astronautics and Aeronautics* in an article entitled "Booster and Orbiter Configurations" by Wilhite et al. One disadvantage of this "piggy-back" arrangement is the misalignment of the payload mass with the thrust axes of the main engines. Also, this arrangement results in undesirably high acoustic levels from air flow and the main rocket engines. Further, this proposal is only useful if the intended payload exceeds the fixed volume of the internal cargo bay.

Accordingly, it is an object of this invention to efficiently alter the cargo volume of a space shuttle.

It is a further object of this invention to achieve the above object with no undesirable misalignment of engine thrust and propellant mass.

It is a further, object of this invention to provide a system that is easily altered for use as an expendable launch system by elimination of the orbiter shell and substitution of payloads and upper series mounted or strap-on stages.

Other objects and advantages of this invention will become apparent in the specification and drawing which follow.

SUMMARY OF THE INVENTION

According to the present invention, the foregoing and additional objects are obtained by providing a space shuttle with a telescoping main propulsion unit and payload. This unit contains the main rocket engines and fuel tanks and telescopes into the shuttle. A variable cavity is located between this unit and the crew compartment. Accordingly, the positioning of the telescoping main propulsion unit determines the volume of the variable cavity. Thus, the volume of the variable cavity may conform to the desired payload. In addition, the length of the entire shuttle may be increased or decreased to achieve desired configurations for optimal storage. In one embodiment of the present invention, the payload also telescopes within the variable cavity.

DETAILED DESCRIPTION OF THE INVENTION

Figure 1:
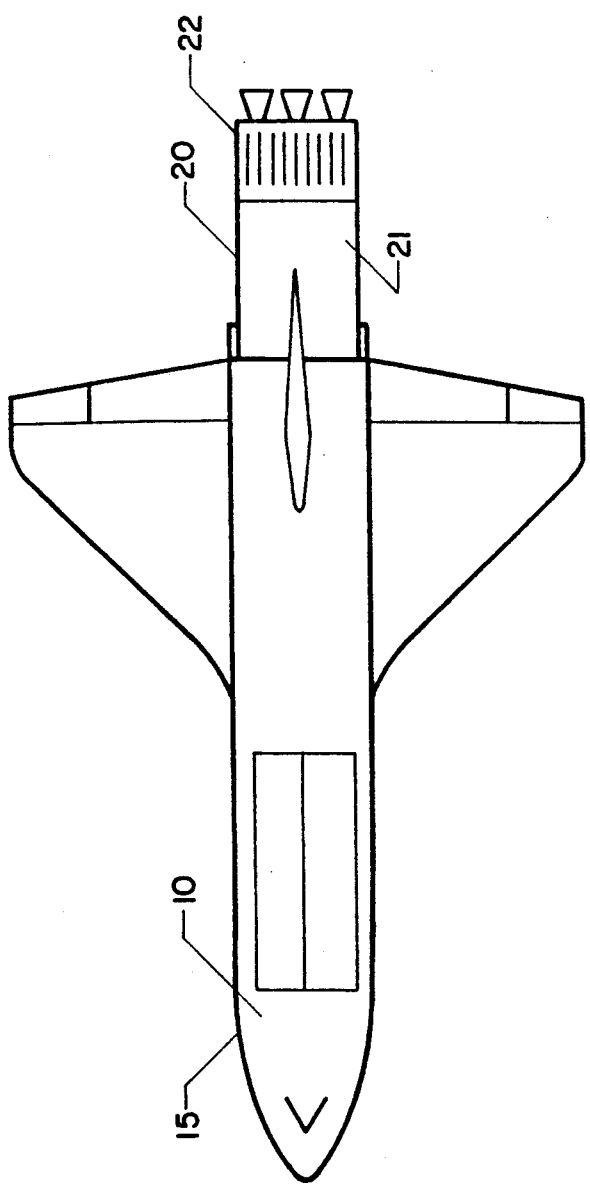
FIG. 1 is a pictorial view of the shuttle orbiter with a telescoping main propulsion unit.

Referring to FIG. 1, a space shuttle orbiter 10 is seen to comprise an orbiter shell 15 and a main propulsion unit 20. Main propulsion unit 20 is comprised of fuel tanks 21 and rocket engines 22. These fuel tanks 21 and rocket engines 22 contain the same functional subsystems contained in the current shuttle external tank and the Orbiter rocket propulsion system.

Figure 2:
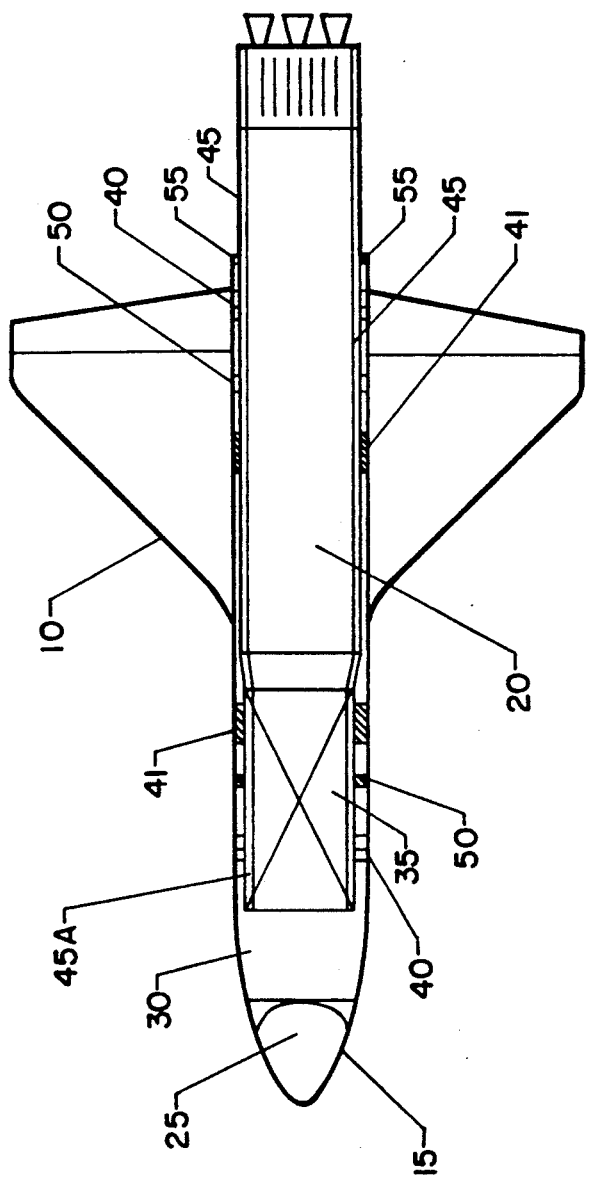
FIG. 2 is an exposed view of the shuttle orbiter with a telescoping main propulsion unit and payload.

Referring now to FIG. 2, an exposed view of space shuttle 10 is shown. A crew compartment 25 is located in the nose portion of shuttle 10. A payload 35 is located aft of crew compartment 25. A variable cavity 30 is located between crew compartment 25 and payload 35. Main propulsion unit 20 is located aft of payload 35. Orbiter shell 15 encloses axially aligned crew compartment 25, variable cavity 30, payload 35, and a portion of main propulsion unit 20.

Figure 3:
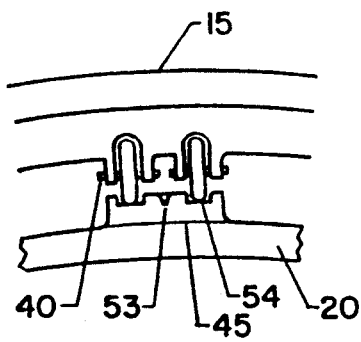
FIG. 3 is a view of unpowered guide rollers abutting the guide rails of the propulsion unit.
Figure 3A:
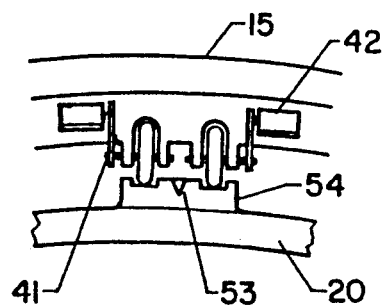
FIG. 3a is a view of powered guide rollers abutting the guide rails of the main propulsion unit.
Figure 4:
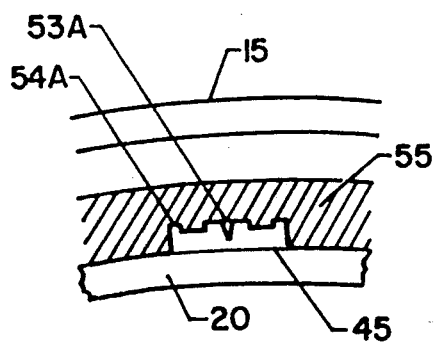
FIG. 4 is a view of the guide rails attached to the payload.

Unpowered guide rollers 40, powered guide rollers 41, and locator pin assemblies 50 are located along the inner walls of orbiter shell 15. Guide rails 45 are attached to the outer surface of main propulsion unit 20. In one specific embodiment of the invention, guide rails 45A are attached to the outer surface of payload 35. The powered and unpowered guide rollers and the locator pin assemblies are aligned with one another in a predetermined number of drive lines corresponding to the number of guide rails. Referring now to FIG. 3, unpowered guide roller 40 is seen to abut track 54 of guide rail 45. Referring now to FIG. 3A, powered guide roller 41 is seen to abut track 54 of guide rail 45. Referring now to FIG. 4, guide rail 45A is seen to include tracks 54A. Unpowered guide rollers 40 and powered guide rollers 41 also abut tracks 54A of guide rail 45A.

Figure 5:
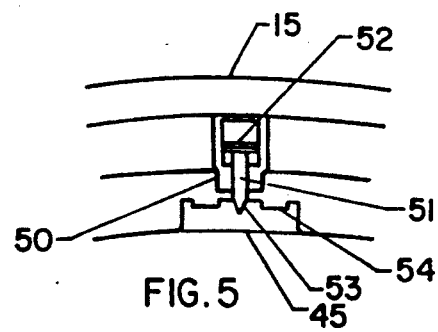
FIG. 5 is a view of the locator pin assemblies.

Referring now to FIG. 5, locator pin assemblies 50 are located along the inner walls of orbiter shell 15. Locator pin assembly 50 consists of a tapered pin 51 and double acting actuator 52 for engagement or disengagement of tapered pin 51. When engaged by double acting actuator 52, tapered pin 51 slides into one of various receiver holes 53 located at intervals along guide rails 45. Likewise, tapered pins 51 may slide into one of various receiver holes 53A located at intervals along guide rails 45A (see FIG. 4).

Positioning of the main propulsion unit 20 relative to crew compartment 25 is achieved by disengaging tapered pins 51 from receiving holes 53 via double acting actuators 50 and causing powered guide rollers 41 to turn against the tracks 54 of guide rails 45 in the direction of the desired positioning. Motors 42 actuate powered guide rollers 41. Accordingly, main propulsion unit 20 moves within orbiter shell 15 relative to crew compartment 25. Unpowered guide rollers 40 facilitate this positioning. Once main propulsion unit 20 achieves the desired position, double acting actuators 52 engage tapered pins 51 into corresponding receiving holes 53 to secure the position of main propulsion unit 20.

Likewise, positioning of payload 35 relative to crew compartment 25 is achieved by disengaging tapered pins 51 from receiving holes 53A via double acting actuators 50 and causing powered guide rollers 41 to turn against the tracks 54A of guide rails 45A in the direction of the desired positioning. Motors 42 activate powered guide rollers 41. Accordingly, payload 35 moves within orbiter shell 15 relative to crew compartment 25. Unpowered guide rollers 40 facilitate this positioning. Once payload 35 achieves the desired position, double acting actuators 52 engage tapered pins 51 into corresponding receiving holes 53A to secure the position of payload 35.

Figure 6:
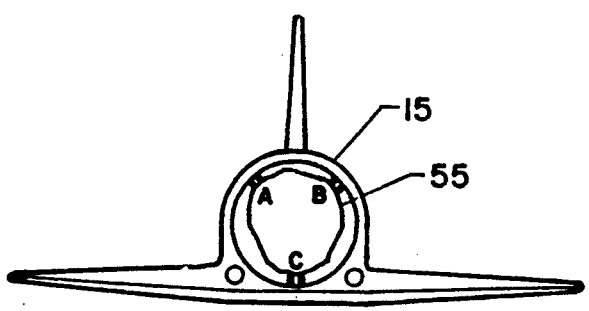
FIG. 6 is an aft view of the shuttle.

Referring now to FIG. 6 and FIG. 2, in one specific embodiment of the present invention unpowered guide rollers 40, powered guide rollers 41, and locator pin assemblies 50 are co-linear in each of three circumferential, equidistant locations A, B, and C. A multiplicity of unpowered guide rollers 40 and receiving holes 53 are employed. The number of powered guide rollers 41 and location pin assemblies 50 depends on the embodiment desired. In most instances, only one set of three co-linear and circumferentially located locator pin assemblies 50 is used per single payload 35 or main propulsion unit 20 because of possible differential thermal expansion between orbiter shell 15 and main propulsion unit 20 and payload 35.

Figure 7:
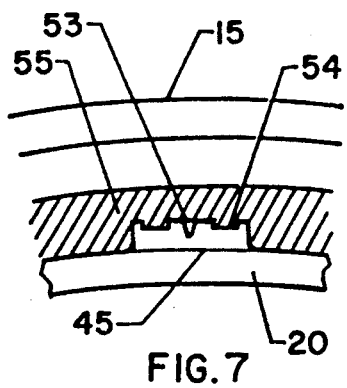
FIG. 7 is a view of curtain seals located at the aft end of the shuttle.

Referring now to FIG. 7 and FIG. 6, a series of contoured curtain seals 55 are provided near the aft end of orbiter shell 15. These seals 55 serve as an acoustic and engine exhaust barrier. Accordingly, shuttle 10 maintains a desired internal pressure as main propulsion unit 20 telescopes.

The present invention thus allows for an efficient varying of the cargo space of a space shuttle. By telescoping main propulsion unit 20 and/or payload 35, the cargo space of shuttle 10 can conform exactly to specific mission requirements. Also, no undesirable misalignment of engine thrust occurs since the telescoping occurs along the longitudinal axis of shuttle 10.

Many improvements, modifications and substitutions will become apparent to one of skill in the art without departing from the spirit and scope of the present invention as described herein and defined in the following claims.

What is claimed is:

1. An improvement for a space shuttle comprising:
   means for propelling the space shuttle;
   a cargo space; and
   means for positioning said means for propelling at various locations within said cargo space such that said means for propelling propels the space shuttle while positioned at one of the various locations, wherein the volume of said cargo space is varied by the positioning of said means for propelling.

2. The improved space shuttle of claim 1 further comprising:
   a payload; and
   means for positioning said payload at various locations within said cargo space.

3. The improved space shuttle of claim 1 wherein said means for positioning includes:
   guide rails attached to said means for propelling;
   powered guide rollers attached to the inner walls of said cargo space and abutting said guide rails; and
   means for securing said means for propelling within said cargo space.

4. The improved space shuttle of claim 3 wherein said means for securing comprises:
   pins attached to the inner walls of the shuttle;
   means for extending and retracting said pins relative to the inner walls of said cargo space; and
   means for receiving said pins into said guide rails.

5. The improved space shuttle of claim 3 further comprising:
   guide rollers attached to the inner walls of the shuttle and abutting said guide rails attached to said means for propelling.

6. The improved space shuttle of claim 2 wherein said means for positioning said payload comprises:
   guide rails attached to said payload;
   powered guide rollers attached to the inner walls of the shuttle and abutting said guide rails; and
   means for securing said payload within said cargo space.

7. The improved space shuttle of claim 6 wherein said means for securing comprises:
   pins attached to the inner walls of said cargo space;
   means for extending and retracting said pins relative to the inner walls of the shuttle; and
   means for receiving said pins into said guide rails attached to said payload.

8. The improved space shuttle of claim 6 further comprising:
   guide rollers attached to the inner walls of the shuttle and abutting said guide rails attached to said payload.

9. The improved space shuttle according to claim 3, wherein three guide rails are equidistantly attached to said means for propelling.

10. The improved space shuttle according to claim 1, wherein said means for propelling comprises a fuel tank connected to an engine.

11. The improved space shuttle according to claim 10, wherein the fuel tank and engine telescope within and without said cargo space along the longitudinal axis of the space shuttle to avoid misalignment of the engine thrust with the shuttle longitudinal axis.

* * * * *